Sept. 19, 1967 R. L. KUTZ 3,343,037

SHORT CIRCUIT PROTECTION CIRCUIT WITH MEANS TO OPEN NORMALLY CLOSED SWITCH CONNECTED IN SERIES WITH LOAD

Filed Dec. 31, 1964 2 Sheets-Sheet 1

INVENTOR
RICHARD L. KUTZ

BY Alfred H. Rosen
Thomas N. Tarrant
ATTORNEYS

Sept. 19, 1967 R. L. KUTZ 3,343,037

SHORT CIRCUIT PROTECTION CIRCUIT WITH MEANS TO OPEN NORMALLY CLOSED SWITCH CONNECTED IN SERIES WITH LOAD

Filed Dec. 31, 1964

2 Sheets-Sheet 2

INVENTOR
RICHARD L. KUTZ

BY Alfred H. Rosen
Thomas N. Tarrant

ATTORNEYS

United States Patent Office 3,343,037
Patented Sept. 19, 1967

3,343,037

SHORT CIRCUIT PROTECTION CIRCUIT WITH MEANS TO OPEN NORMALLY CLOSED SWITCH CONNECTED IN SERIES WITH LOAD

Richard L. Kutz, Waltham, Mass., assignor, by mesne assignments, to Honeywell Inc., a corporation of Delaware Filed Dec. 31, 1964, Ser. No. 422,721
16 Claims. (Cl. 317—33)

This invention relates to circuits for protection against direct current shorts and in particular to protection in a low impedance output circuit against abnormal loads, such as occur accidentally during testing and by failures in following circuitry.

With the increasing complexity in electronic circuitry of today, it has become necessary to go to miniaturization and high density packaging to conserve space. This is particularly so, for example, in the more sophisticated digital computers in which thousands and even hundreds of thousands of active stages are utilized. One of the techniques to optimize packaging density is to break the complete circuitry of the electronic apparatus up into modules, with each module containing one, or more commonly, a number of operational stages. Each of these modules is plugged into harnessing, interconnecting all the different modules. Due to miniaturization techniques, it is usually difficult or impossible to repair a failure in a given module so that repair practice is to replace complete modules.

In the most advanced electronic circuits of today, the circuit modules are monolithic chips in which the active and passive components are integrated with the supporting substrate. Where the modules are monolithic chips, repair of a module is impossible. In equipment using many hundreds of these chips, it is important to keep failures to a minimum and to prevent failures in one chip from interacting on other chips.

While in modular electronic circuitry the replacement of any one moduule is usually quite expensive, the most expensive factor is usually the downtime of the apparatus, as well as the technician time expended in repair. Where it is possible to prevent a failure in one module from interacting so as to produce failure in other modules, the ease and speed of repair is greatly improved.

In digital computer circuitry, the most common form of signal used is a two level signal which graphically would appear as some form of squarewave. Thus a signal passing from one module to another will normally be a squarewave with desirably a fast rise time. Since interconnecting wiring between modules and input circuitry to a following module will usually contain a substantial capacitance factor, this fast rise time is difficult to maintain unless the output circuit of the module has a very low impedance. A low impedance output circuit preferably has a minimum of load limiting impedances in series with it. With little load limitation, an excessive load, such as produced by a direct current short circuit, can readily draw enough current to quickly overheat the circuit elements in such an output circuit.

In circuitry where microminiaturization and high density packaging are not critical, it has been customary to insert capacitors between stages to prevent direct current short circuits. However, to maintain fast rise time, such capacitors have to be larger than can readily be incorporated in monolithic circuitry.

In accordance with the present invention, a novel circuit has been discovered for opening a low impedance switch in a low impedance output circuit, when and only when an excessive load appears across the output. This switch is operated by the voltage appearing across the output load. A triggering device connected between the output load and the low impedance switch holds the switch in a closed position as long as normal signal voltages appear across the load and triggers the switch open upon a loss of proper signal voltage across the load. Thus it is an object of the present invention to define a low impedance output circuit containing an active element switch opening said circuit in the presence of a direct current short.

It is a further object of the present invention to define solid state switching circuitry between a source and a load which will close responsive to an electrical signal, and will open responsive to a short circuit in the load.

It is still a further object of the present invention to define a digital amplifier having a low impedance output which switches to a high impedance when a short circuit appears at the output.

Further objects and features of the present invention will be better understood by reading the specification along with the accompanying drawings in which.

Figure 1:
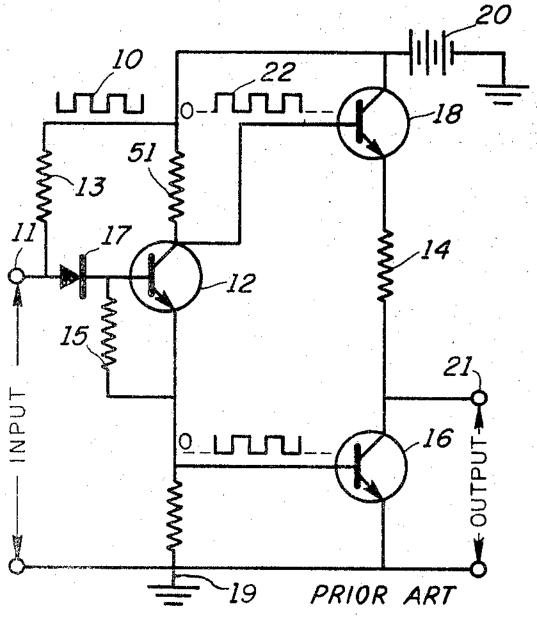
FIG. 1 is a schematic of a prior art digital amplifier stage.

FIG. 1 shows a conventional inverter amplifier for use in digital circuitry. A transistor amplifier 12 is connected in split-phase fashion with the emitter connected to the base of transistor switch 16 and the collector connected to the base of transistor switch 18. Transistor 18 is connected with its collector to a voltage source 20 and its emitter to an output terminal 21 while transistor switch 16 is connected with its collector to output terminal 21 and its emitter to reference 19 for voltage source 20.

In operation, negative signal pulse 10 on input terminal 11 biases transistor 12 out of conduction so that the voltage on the base of transistor 18 rises. This biases transistor 18 into the conducting condition so that current will readily flow through a load in the output through the emitter-collector circuit of transistor 18 to the voltage source 20. At the same time, with transistor 12 nonconducting, and diode 17 blocked by the negative voltage at the input, there is no current path for the base-emitter circuit of transistor 16. Thus, transistor 16 is shut off and provides a high impedance path between voltage reference 19 and output terminal 21. When the input signal 10 rises again, transistors 12 and 16 go into conduction with bias current flowing through the circuit comprising reference 19, the emitter-base diode of transistor 16, the emitter-base diode of transistor 12, diode 17 and back to the source through resistor 13. Since the path through the base-emitter diode of transistor 16 and through the emitter-collector circuit of transistor 12 now has a very low impedance compared to the resistance of load resistor 51 in the collector circuit of transistor 12, the voltage on the collector of transistor 12 drops nearly to reference potential and transistor 18 is switched to its high impedance condition. Transistor 16 establishes simultaneously a low impedance path between output terminal 21 and reference 19, placing a virtual short circuit across the output sharply terminating the output signal developed across the load.

Thus this circuit has two switches, one for establishing a low impedance path to a source and the other for establishing a low impedance path to reference; both with respect to a single output terminal. This has the advantage of providing the steep rise and fall times desired in digital circuitry even when there is capacitance or sweepout current to be overcome in the load.

The circuit of FIG. 1 has the drawback that a short circuit in the output would quickly overheat and burn out transistor 18. To give some protection against excessive loads a current limiting resistor 14 is commonly added in series between the source and the load. This however degrades the fast rise time desired at the output.

Figure 2:
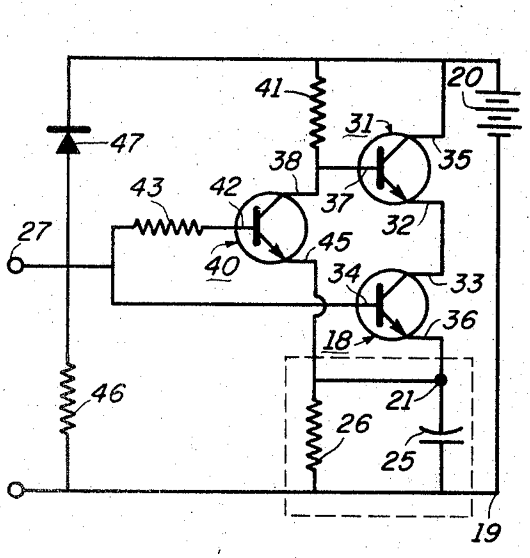
FIG. 2 is a schematic illustrating the protective features of the present invention.

FIG. 2 shows a portion of a circuit similar to that in FIG. 1 illustrating a protective circuit against overloads in accordance with the invention. In the figures, like numbers are used to describe like circuit elements. Thus, transistor switch 18 in FIG. 2 is similar to and functions the same way as transistor 18 in FIG. 1. Capacitor 25 and resistor 26 do not represent actual elements in the circuit but are to represent the resistance and capacitance factors presented by the input circuitry of a following stage. As in FIG. 1, the collector-emitter circuit of transistor switch 18 is connected between voltage source 20 and output terminal 21. Base 34 of transistor 18 is connected to input terminal 27. In series between collector electrode 33 of transistor switch 18 and voltage source 20 is the collector-emitter circuit of second transistor switch 31. In the series connection illustrated, emitter electrode 32 of transistor switch 31 is directly connected to collector electrode 33 of transistor switch 18. Collector electrode 35 of transistor switch 31 is directly connected to voltage source 20 and emitter electrode 36 of transistor switch 18 is directly connected to output terminal 21. Connected to base electrode 37 of transistor switch 31 is collector electrode 38 of third transistor 40. Collector electrode 38 is also connected to voltage source 20 through load resistor 41. Base electrode 42 of transistor 40 is connected to input terminal 27 through biasing resistor 43. Emitter electrode 45 of transistor 40 is connected to output terminal 21.

Resistor 46 across the input terminals represents an impedance path to reference 19 to maintain the base electrodes of transistors 18 and 40 at reference level in the absence of an input signal. Diode 47 between input terminal 27 and source 20 represents a limitation on the input voltage so that it cannot exceed the voltage of source 20. Resistor 46 and diode 47 represent factors that are normally afforded by preceding circuits as can be seen by referring to FIGS. 3 and 4. Thus resistor 46 and diode 47 have been illustrated only to help explain the operation of the circuit.

Transistors 18 and 31 are low impedance switches adapted to operate as a low impedance connection to voltage source 20, when their base-emitter circuits are biased to saturation. Upon the application of a positive going input signal at terminal 27, the emitter-base circuit of transistor switch 18 is biased to saturation, placing the collector-emitter circuit of transistor 18 in condition for full conduction. With transistor switch 18 in conduction condition, the bias across the base-emitter diode of transistor 31 becomes the voltage difference between output terminal 21 and collector electrode 38 of transistor 40. As long as transistor 40 is not conducting, the voltage drop across resistor 41 will be relatively small and the base-emitter diode of transistor 31 will be biased into saturation placing transistor 31 into full conduction. This establishes a low impedance path between output terminal 21 and voltage source 20. Transistor 31 will go into full conduction only when transistor 40 is nonconducting. Since the application of a positive going signal across input terminals 27 would normally cause transistor 40 as well as transistor switch 18 to conduct, it is necessary to insure a period of delay between the times that transistor switch 18 and transistor 40 could be expected to go into conduction. This delay is provided by resistor 43 in the base circuit of transistor 40. Resistor 43 increases the time interval necessary for sufficient current build up through the emitter-base circuit of transistor 40 to place transistor

40 into conduction. When transistor switches 18 and 31 go into full conduction, the low impedance path to the load allows capacitance in the load to reach full charge almost instantaneously and the source voltage appears across the load impedance. The voltage appearing across the load also appears at the emitter electrode of transistor 40. This reduces the base-emitter bias on transistor 40 preventing transistor 40 from going into conduction and insuring that transistor switch 31 will remain in full conduction as long as the input signal reaching the base of transistor switch 18 is positive.

The protection function of the circuit can now be readily explained by observing what will happen as a short circuit is placed across the load. With a short circuit between output terminal 21 and reference 19, the voltage at terminal 21 and thus at emitter electrode 45 cannot rise with current through the load. Thus, emitter electrode 45 is maintained at reference potential and the positive input signal builds up the emitter-base current in transistor 40 until transistor 40 goes into conduction. With transistor 40 in conduction, it provides a low impedance path from output terminal 21 so that the voltage at the output terminal 21 appears at the base of transistor switch 31. This removes the emitter-base bias on transistor switch 31 taking it out of conduction and opening the low impedance path between source 20 and output terminal 21.

Generally, the circuitry applying the positive going signal at terminal 27 will be operated off the same voltage source 20 used in the circuitry of FIG. 2. Thus, the maximum positive level of the signal will never exceed the voltage of source 20 and the voltage appearing at base electrode 42 of transistor 40 can never exceed the voltage that will appear at output terminal 21 when there is an adequate load impedance and transistor switches 18 and 31 are in full conduction.

Figure 3:
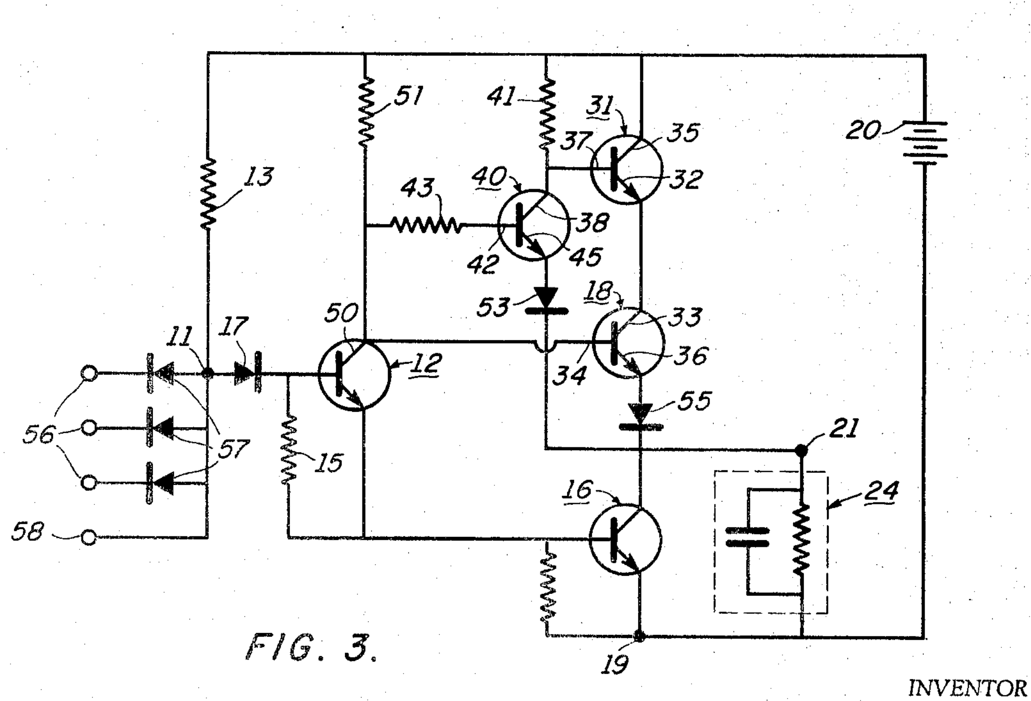
FIG. 3 is a schematic of one embodiment of a complete amplifier stage in accordance with the invention.

While FIG. 2 illustrates significant features of the invention in the simplest form possible, FIG. 3 is a practical embodiment of the invention used as an inverter amplifier circuit. Since many of the features of this embodiment are identical to many of those described in FIG. 2, reference can be made to the description of FIG. 2 for a more detailed disclosure of those parts of the circuit.

In FIG. 3, transistor 12 providing the inverter amplifier function as in FIG. 1 is connected with an output switching circuit having the protective features of FIG. 2. Thus, in FIG. 3, collector electrode 50 of transistor 12 is directly connected to base electrode 34 of transistor switch 18 and also through a resistor 43 to base electrode 42 of transistor 40. Electrode 50 is also connected to voltage source 20 through a load resistor 51. Also, as in FIG. 1, transistor 16 is connected between output terminal 21 and reference 19 of voltage source 20. The output load 24, not considered to be part of this circuit, is indicated inside a dashed box. A diode 53 is added between emitter 45 of transistor 40 and output terminal 21, and a diode 55 between emitter 36 of transistor switch 18 and terminal 21. These diodes are connected for forward current flow in the same direction as through the base-emitter diodes of transistors 40 and 18 respectively. Transistor switch 16 has the same position and function as in FIG. 1.

The circuit in FIG. 3 has a plurality of input terminals 56 with series isolating diodes 57. One end of each diode 57 is connected at terminal 11 in the input circuit of transistor 12. Various arrangements of passive input elements as well known in the digital computer art may be utilized in this position to perform logic or other input functions.

Unisolated input terminal 58 may be used to set an input bias level. Normally, the bias voltage level set at terminal 58 in the particular circuit arrangement of FIG. 3 will have sufficient positive value to bias transistor 12 into conduction. This will produce electron flow from voltage reference 19 through the emitter-base diode of transistor switch 16 and through the emitter-base diode of transistor 12, through diode 17, resistor 13 and to voltage source 20. This places transistor 12 in conduction so that a large percentage of the source voltage is dropped across load resistor 51 leaving collector electrode 50 at nearly reference voltage. Transistor switch 16 is also driven into conduction so that it places a virtual short circuit across any load connected to output terminal 21 and reference. Thus, transistor 16 enables greater speed of operation by abruptly terminating any residue from a preceding pulse. Residue of any preceding pulse stored in the load degrades the fall time of the output pulse and limits the maximum usable pulse rate.

When a negative going signal is received at any one of terminals 56, current flows through, resistor 13 dropping the voltage at point 11 and blocking diode 17. This removes forward bias current from transistor 12 and transistor 12 and transistor 16 so that both transistors 12 and 16 go into a high impedance condition. With transistor 12 in a high impedance condition, there is little voltage drop across resistor 51, and the voltage on collector electrode 50 rises and with it the voltage on base electrode 34 of transistor switch 18. Current flow will now pass through the load through dode 55 and the emitter-base diode of transistor 18, biasing transistor 18 into its low impedance state. In the absence of an input signal, base electrode 37 of transistor switch 31 has a positive bias from collector electrode 38 of transistor 40. Thus, as soon as a current path is established through transistor 18, transistor 31 conducts providing a low impedance circuit between voltage source 20 and a load connected between output terminal 21 and reference.

When the voltage at collector electrode 50 goes positive, the switching of transistor 18 is not quite instantaneous since a finite time is required for sufficient current to build up through the emitter-base diode. The same is true of transistor 40. However, it will be noted that the base 42 and emitter 45 of transistor 40 are connected to the same points as the base and emitter respectively of transistor 18. Under these conditions, transistor 40 could go into conduction earlier or simultaneously with transistor 18. With transistor 40 in conduction, the resulting voltage drop across resistor 41 would remove the forward bias from the emitter-base diode of transistor 31 preventing it from going into conduction and maintaining a high impedance path to output load terminal 21. In order to avoid this, a resistor 43 is added in the base circuit of transistor 40 to increase the time interval required to put transistor 40 into conduction with respect to the time interval required for transistor 18.

Once the low impedance path is established through transistor switches 18 and 31 to voltage source 20, nearly the full voltage of source 20 should appear across the load at output terminal 21. This voltage rise also appears at emitter electrode 45 of transistor 40 preventing transistor 40 from going into conduction. This same factor provides the protective feature of the invention.

In the absence of an adequate voltage rise at terminal 21 while both transistors 18 and 31 are in the low impedance condition, transistor 40 will be biased on by the positive voltage at collector electrode 50 of transistor 12 and will in turn, turn off transistor switch 31 breaking the low impedance path to the source. Conditions under which such a voltage will not rise at output terminal 21 will occur when there is a short circuit in the load due to a faulty component, or, for example, in testing when a test probe accidentally short circuits a lead.

It has been found desirable to add diodes 53 and 55 in the emitter circuits of transistors 40 and 18 to add a small increase in the voltage required to switch these transistors into conduction. This offers some protection against noise and disturbances that otherwise might cause faulty operation of the circuit.

It will readily be seen that there are many alternatives to resistor 43 to provide a delay between transistors 18 and 40. For example, transistor 40 may be selected to have a slower turn on time than transistor 18, in which case, nothing further is needed for this purpose.

Figure 4:
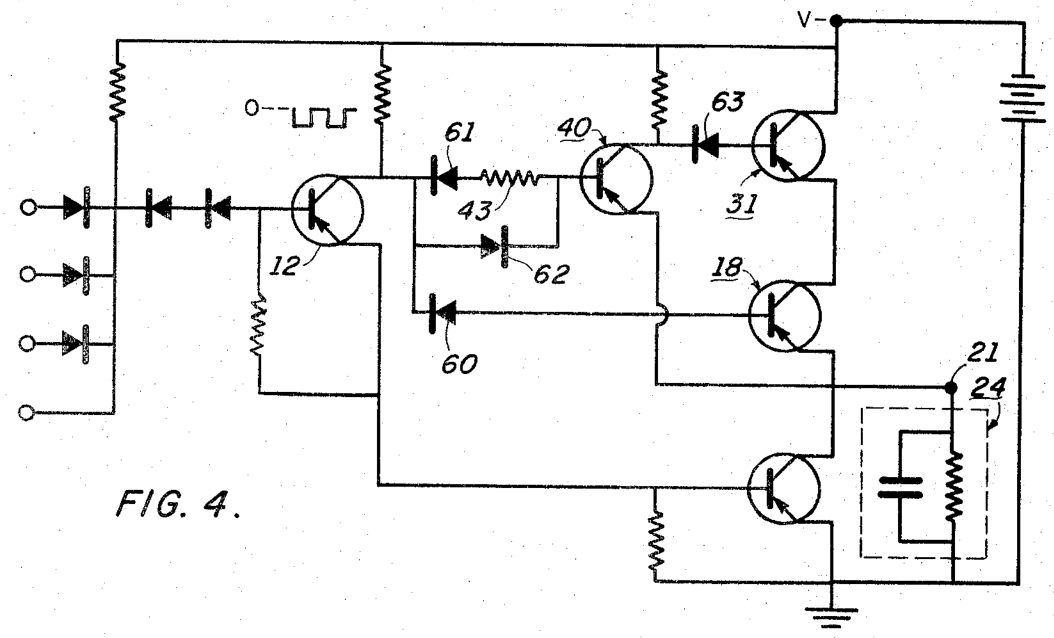
FIG. 4 is a schematic of a second embodiment of a complete amplifier stage in accordance with the invention.

While FIG. 3 shows one embodiment of an amplifier circuit in accordance with the invention, many other arrangements are possible. One other embodiment is illustrated in FIG. 4 using reversed polarities, transistors of the complementary type and diodes serving the same function as diodes 53 and 55 of FIG. 3 but positioned in the base circuits of transistors 18 and 40 instead of the emitter circuits. Thus, in FIG. 4, all the transistors are PNP types instead of the NPN transistors illustrated in FIG. 3. All voltage polarities are reversed and all diodes are reversed. A diode 60 connected in the base circuit of transistor 18 serves the same function of protecting transistor 18 against undesired conduction as does diode 55 in FIG. 3. Diode 61 in the base circuit of transistor 40 likewise serves the same purpose as diode 53 in FIG. 3. The position of diode 61, with respect to resistor 43, is of no significance and it may as well be placed on the other side of the resistor. Diode 62, directly connected between the base of transistor 40 and the collector of transistor 12 and connected with polarities reversed relative to diode 61, serves as a low impedance path across resistor 43 and diode 61 to permit faster turnoff of transistor 40. A diode 63 is directly connected between the base of transistor 31 and the collector of transistor 40 positioned for forward current flow in the same direction as the base-emitter diode of transistor 31. Diode 63 functions to increase the voltage required to turn on transistor 31. This is desirable since a short circuit in the load may still leave some small residual voltage level which could otherwise keep transistor 31 in conduction after transistor 40 has been triggered on.

Figure 5:
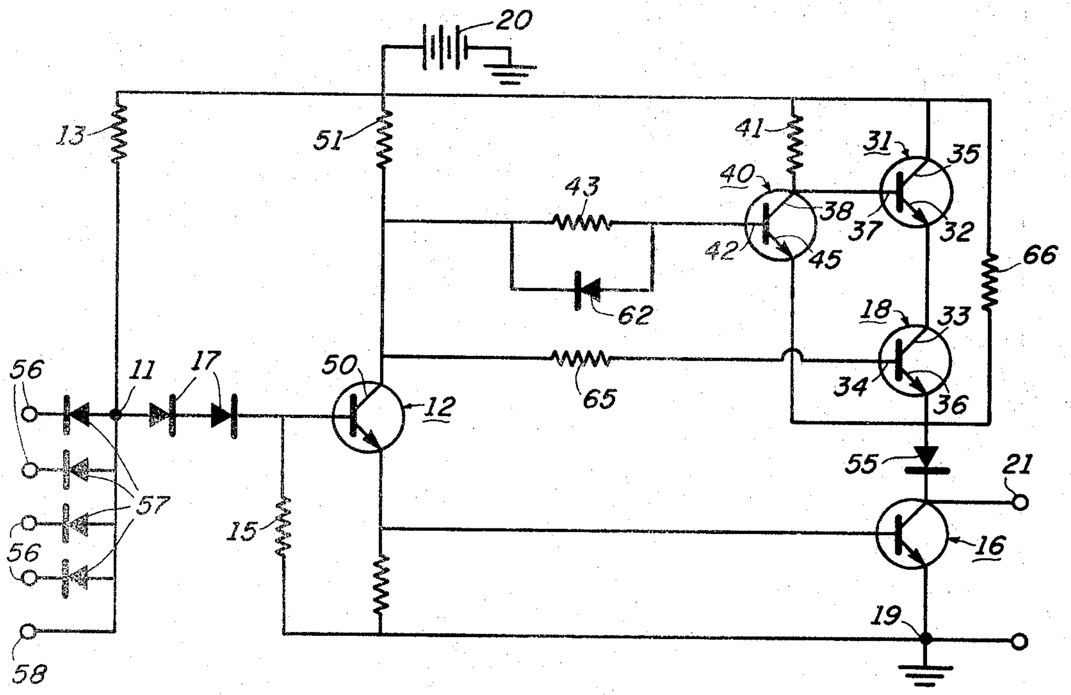
FIG. 5 is a schematic of a third embodiment of a complete amplifier stage in accordance with the invention.

FIG. 5 shows a third embodiment of a protected inverter amplifier similar to that in FIG. 3. The embodiment of FIG. 5 permits greater tolerance in the selection of circuit elements by the addition of resistor 65 connected between collector 50 of transistor 12 and resistor 66 connected between source 20 and emitter 36 of transistor 18.

Resistor 66 passes enough current to maintain the output potential if there is any time lapse between the turnoff of transistor 18 and the turnon of transistor 16. Resistor 66 also provides current to maintain a voltage drop across diode 55 insuring that transistor 18 stays off while transistor 16 is conducting. This same voltage drop across diode 55 prevents current flow in transistor 40 which might otherwise cause transistor 40 to go erratically into conduction when the collector of transistor 12 goes positive.

It can be noted that emitter 45 of transistor 40 is connected directly to emitter 36 of transistor 18 in FIG. 5. This arrangement eliminates diode 53 of FIG. 3 and utilizes diode 55 for the function of both diodes 53 and 55 of FIG. 3. This change permits the voltage drop across diode 55 provided by resistor 66, to improve the stability of transistor 40 as stated above.

Resistor 65 added between collector 50 of transistor 12 and base 34 of transistor 18 provides greater reliability in the operation of transistor 40. For example, without resistor 65 the base-emitter bias applied to transistor 40 in FIG. 5 cannot exceed the voltage drop across the base-emitter of transistor 18. With overload current flowing through transistor 18, this voltage drop can be quite small and may not be enough to bias transistor 40 into conduction. Resistor 65 permits the voltage across the base-emitter of transistor 40 to exceed that across the base-emitter of transistor 18.

In order that the necessary time lapse is maintained between the switching of transistors 18 and 40 when collector 50 of transistor 12 goes positive, resistor 65 must have a relatively small resistance compared to resistor 43.

Diode 62 connected across resistor 43 functions pretty much the same as in FIG. 4. It serves to prevent base 42 of transistor 40 from building up a positive bias with respect to collector 50 of transistor 12. This improves the operational stability and speed of transistor 40.

While the circuits in accordance with the present invention are particularly useful in monolithic circuits, due in part to the avoidance of capacitors which are difficult to produce with monolithic techniques, it is not intended that the invention be limited to miniaturized circuits. The power handling limitations are only those of the particular circuit elements used, and the invention is applicable to most situations in which a low impedance source is switched on and off to a load. The invention is adaptable to use with vacuum tubes as well as solid state elements.

The manipulation of the circuitry for effecting desired time constants and other factors is readily made without departing from the scope of the invention. Thus, while the invention has been described in terms of specific embodiments, it is not intended to be limited thereby but it is intended to claim the invention broadly within the scope and spirit of the appended claims.

What is claimed is:

1. An overload protection circuit comprising a normally closed switch and a normally open switch connected in series between a voltage source and a load, means to close said normally open switch responsive to an electrical signal, and means to open said normally closed switch in the absence of a voltage rise across said load upon closure of said normally open switch.

2. An overload protection circuit according to claim 1 in which said switches are solid state switches.

3. A circuit for protecting against direct current shorts comprising a normally closed transistor switch connected in series with a normally open transistor switch between a voltage source and a load, means to close said normally open transistor switch responsive to an electrical signal, active element means for opening said normally closed transistor switch responsive to said electrical signal, means for delaying the operation of said active element means with respect to the closing of said normally open transistor switch, and circuit means for rendering said active element means inoperative during a normal voltage rise across said load.

4. A solid state protected low impedance output for modular circuit components comprising a normally open transistor switch with its collector and emitter electrodes connected in series with the collector and emitter electrodes of a normally closed transistor switch between a voltage source and an output terminal, an input terminal for said low impedance output connected to the base electrode of said normally open transistor switch, a resistor connected between said input terminal and the base electrode of a third transistor, the collector electrode of said third transistor connected to the base electrode of said normally closed transistor switch, and the emitter electrode of said third transistor connected to said output terminal so that a signal on said input terminal will close said normally open transistor switch providing a low impedance path between said voltage source and said output terminal as long as a voltage rise at said output terminal maintains a reverse bias across the emitter-base electrodes of said third transistor.

5. A transistor switch with short circuit protection comprising a first transistor, a second transistor and a third transistor each having emitter, collector and base electrodes, an input terminal connected to the base electrodes of said first transistor and said second transistor, an output terminal connected to the emitter electrodes of said first transistor and said second transistor, a direct connection between the collector electrode of said second transistor and the emitter electrode of said third transistor, a connection between the collector electrode of said first transistor and the base electrode of said third transistor, a resistive connection between the collector electrode of said first transistor and the collector electrode of said third transistor, a reference terminal for both said input and said output terminals, and means to connect a voltage source between the collector electrode of said third transistor and said reference terminal.

6. A transistor switch according to claim 5 in which the connection between said output terminal and the emitter electrodes of said first and second transistors comprises a diode in series with the emitter of each transistor connected for forward current flow in the same direction as through the emitter-base diodes of said first and second transistors.

7. A transistor switch according to claim 5 in which the connection between said input terminal and the base electrodes of said first and second transistors comprises a diode in series with the base of each transistor connected for forward current flow in the same direction as through the base-emitter diodes of said first and second transistors.

8. A transistor switch according to claim 5 in which said input terminal is connected to the base electrode of said first transistor by means of a resistor.

9. A digital amplifier comprising first, second, third, fourth and fifth transistors each having a base electrode, an emitter electrode and a collector electrode, a plurality of input terminals, a digital logic network connected between said input terminals and the base electrode of said first transistor, a potential source connected between one point designated "reference" and a second point designated "supply," a resistive connection between the collector electrode of said first transistor and supply, a connection between the emitter electrode of said first transistor and the base electrode of said second transistor, a connection between the emitter electrode of said second transistor and reference, an output terminal, a connection between the collector electrode of said second transistor and said output terminal, a connection between the collector electrode of said first transistor and the base electrode of said third transistor, a resistive connection between the collector electrode of said third transistor and supply, a connection between the emitter electrode of said third transistor and said output terminal, a connection between the collector electrode of said third transistor and the base electrode of said fourth transistor, a connection between the collector electrode of said fourth transistor and supply, a connection between the collector electrode of said first transistor and the base electrode of said fifth transistor, a connection between the collector electrode of said fifth transistor and the emitter electrode of said fourth transistor, and a connection between the emitter electrode of said fifth transistor and said output terminal.

10. A digital amplifier according to claim 9 in which the connection between the collector electrode of said first transistor and the base electrode of said third transistor is a resistive connection.

11. A digital amplifier according to claim 10 in which the connection between the collector electrode of said first transistor and the base electrode of said fifth transistor is a resistive connection.

12. A digital amplifier according to claim 9 in which the connections between the emitter electrode of said first transistor and the base electrode of said second transistor, the emitter electrode of said second transistor and reference, the collector electrode of said second transistor and said output terminal, the collector electrode of said third transistor and the base electrode of said fourth transistor, the collector electrode of said fourth transistor and supply, and the collector electrode of said fifth transistor and the emitter electrode of said fourth transistor are all direct connections.

13. A digital amplifier according to claim 12 in which the connection between the emitter electrode of said third transistor and said output terminal comprises a unilateral impedance and the connection between the emitter electrode of said fifth transistor and said output terminal comprises a unilateral impedance.

14. A digital amplifier according to claim 12 in which both the connection between the emitter electrode of said third transistor and said output terminal and the connection between the emitter electrode of said fifth transistor and said output terminal comprise a single unilateral impedance.

15. A digital amplifier according to claim 14 further including a resistive connection between the emitter electrode of said fifth transistor and supply.

16. A high speed solid state amplifier comprising a first transistor connected to amplify an incoming signal, a second transistor driven by said first transistor and operated as a switch in series between a voltage source and an output load, a third transistor driven by said first transistor and operated 180° out of phase with said second transistor as a switch across said output load, a fourth normally conductive transistor connected in series with said second transistor between said source and said load, and a fifth transistor driven by said first transistor and operated to switch said fourth transistor to a non-conductive condition unless the driving signal is counteracted by a voltage rise across said output load, so that substantially the full source appears across said load during a first portion of an input cycle, a short circuit appears across said load during a second portion of said input cycle and a high impedance is placed between said load and said source in the absence of a voltage rise across said load during said first portion of said input cycle.

References Cited

UNITED STATES PATENTS

| | | | |
|---|---|---|---|
| 3,058,036 | 10/1962 | Reuther et al. ---- | 317—33 X |
| 3,262,015 | 7/1966 | McNamee et al. ------ | 317—20 |

MILTON O. HIRSHFIELD, *Primary Examiner.*

R. V. LUPO, *Assistant Examiner.*